(12) United States Patent
Stiesdal

(10) Patent No.: US 8,696,302 B2
(45) Date of Patent: Apr. 15, 2014

(54) WIND TURBINE COMPRISING A MAIN BEARING AND METHOD FOR REPLACEMENT OF THE MAIN BEARING

(75) Inventor: Henrik Stiesdal, Odense (DK)

(73) Assignee: Siemens Aktiengesellschaft, Munich (DE)

( * ) Notice: Subject to any disclaimer, the term of this patent is extended or adjusted under 35 U.S.C. 154(b) by 541 days.

(21) Appl. No.: 13/001,650

(22) PCT Filed: Jul. 1, 2009

(86) PCT No.: PCT/EP2009/058235
§ 371 (c)(1),
(2), (4) Date: Dec. 28, 2010

(87) PCT Pub. No.: WO2010/003852
PCT Pub. Date: Jan. 14, 2010

(65) Prior Publication Data
US 2011/0110769 A1    May 12, 2011

(30) Foreign Application Priority Data
Jul. 7, 2008    (EP) .................................. 08012251

(51) Int. Cl.
*F03D 1/00*    (2006.01)
*F03D 11/00*    (2006.01)

(52) U.S. Cl.
USPC ............. 415/4.3; 415/4.5; 415/111; 415/132; 415/170.1; 415/229; 290/44; 290/55

(58) Field of Classification Search
USPC ........ 415/4.3, 4.5, 110, 111, 132, 170.1, 229; 290/44, 55
See application file for complete search history.

(56) References Cited

U.S. PATENT DOCUMENTS

| | | | | |
|---|---|---|---|---|
| 4,527,072 A | * | 7/1985 | van Degeer | 416/152 |
| 6,866,423 B2 | * | 3/2005 | Faltus et al. | 384/559 |
| 7,255,537 B2 | * | 8/2007 | Flamang et al. | 416/170 R |
| 7,385,305 B2 | * | 6/2008 | Casazza et al. | 416/61 |
| 2002/0141893 A1 | | 10/2002 | Hoshino | |
| 2007/0222226 A1 | * | 9/2007 | Casazza et al. | 290/55 |

FOREIGN PATENT DOCUMENTS

| | | |
|---|---|---|
| CN | 101014787 A | 8/2007 |
| DE | 20116649 U1 | 12/2001 |
| EP | 1291521 A1 | 3/2003 |
| EP | 1489297 A1 | 12/2004 |
| GB | 2395529 A | 5/2004 |
| JP | 2002257244 A | 9/2002 |
| JP | 2006046107 A | 2/2006 |
| JP | 2008032147 A | 2/2008 |
| WO | WO 2006066686 A1 | 6/2006 |

* cited by examiner

*Primary Examiner* — Igor Kershteyn

(57) ABSTRACT

A wind turbine is provided comprising a rotatable main shaft having a centre axis and being at least indirectly connected to a wind turbine rotor of the turbine and a main bearing supporting the rotatable main shaft at least indirectly against a first stationary part of the turbine, wherein fastening unit are provided for fastening the rotor to the first or a second stationary part of the turbine during replacement of the main bearing and tappet unit are provided which are able to act on the main bearing and permit a movement of the main bearing relatively to the first stationary part in the direction of the centre axis. A method for replacement of a main bearing is also provided.

15 Claims, 3 Drawing Sheets

WIND TURBINE COMPRISING A MAIN BEARING AND METHOD FOR REPLACEMENT OF THE MAIN BEARING

CROSS REFERENCE TO RELATED APPLICATIONS

This application is the US National Stage of International Application No. PCT/EP2009/58235, filed Jul. 1, 2009 and claims the benefit thereof. The International Application claims the benefits of European application No. 080122518 DE filed Jul. 7, 2008. All of the applications are incorporated by reference herein in their entirety.

FIELD OF INVENTION

The invention relates to a wind turbine comprising a main bearing and to a method for replacement of the main bearing.

BACKGROUND OF INVENTION

A wind turbine comprises as main components a tower, a nacelle, a wind turbine rotor containing a hub and wind turbine rotor blades as well as a generator having a stator and a rotor arrangement and being typically arranged inside the nacelle. The rotor arrangement of the generator is at least indirectly connected to the wind turbine rotor for moving the rotor arrangement relatively to the stator arrangement for electrical power generation.

SUMMARY OF INVENTION

There are different types of drive configurations of wind turbines to transfer the rotation of the wind turbine rotor to the rotor arrangement of the generator. But virtually in each configuration at least one main bearing is required. Such a main bearing or such main bearings are subject to different loads during operation of the wind turbine. It is not unusual that after a certain period of operation of a main bearing wear appears or the main bearing fails. As a consequence replacement of the main bearing is required. For replacement of a main bearing typically the wind turbine rotor has to be removed. This is not only an immense technical effort, but causes additionally a lot of costs.

It is therefore an object of the present invention to provide a wind turbine as well as a method as initially mentioned in such a way, that the replacement of a main bearing is simplified and preferably less expensive.

This object is inventively achieved by a wind turbine comprising a rotatable main shaft having a centre axis and being at least indirectly connected to a wind turbine rotor of the wind turbine and at least one main bearing supporting the rotatable main shaft at least indirectly against a first stationary or fixed part of the wind turbine, wherein fastening means are provided for fastening the wind turbine rotor to the first or a second stationary or fixed part of the wind turbine during replacement of the at least one main bearing and tappet means are provided which are able to act on the at least one main bearing and permit a movement of the at least one main bearing relatively to the first stationary part in the direction of the centre axis. The fastening means permit to fix the wind turbine rotor on a stationary part of the wind turbine during replacement of the at least one main bearing. This stationary part is able to be the first stationary part of the wind turbine or any other proper stationary or fixed part of the wind turbine. Thus the wind turbine rotor is able to be brought in a stable and safe position. After release of the detachable connection between the at least one main bearing and the first stationary part it is possible to move the at least one main bearing relatively to the first stationary part, in particular to move the at least one main bearing into a part of the wind turbine where it is able to be replaced by another main bearing. Thereby the tappet means are able to act in the course of replacement of the at least one main bearing on the at least one main bearing, so that a movement of the at least one main bearing in the direction of the centre axis is achieved. In this way a replacement of at least one main bearing of a wind turbine is able to be achieved without removing the wind turbine rotor. As a consequence the replacement of a main bearing is technically simplified and also less expensive.

According to an embodiment of the invention the fastening means comprise bolt holes e.g. of the stationary part and/or the wind turbine rotor, bolts and/or at least one shim. During operation of the wind turbine there need to be a gap between the wind turbine rotor and the first and the second stationary part. When the wind turbine rotor is fixed to the first or the second stationary part of the wind turbine for replacement of the at least one main bearing, at least on shim, typically a plurality of shims are arranged on different positions in the gap. In this way the wind turbine rotor and the first or the second stationary part are able to be bolted together without any substantial deflection of the bolted parts. When the gap between the wind turbine rotor and the first or the second stationary part is however comparatively small, so that there is no substantial deflection when the wind turbine rotor and the first or the second stationary part are bolted together the shims are able to be omitted.

In a variant of the invention the tappet means are provided on the rotatable main shaft, wherein in the course of replacement of the at least one main bearing the connection between the rotatable main shaft and the wind turbine rotor is released and preferably the rotatable main shaft and the at least one main bearing are moved together relatively to the first stationary part in the direction of the centre axis. Thereby the tappet means of the rotatable main shaft act on the at least one main bearing. According to that the tappet means take the at least one main bearing along with the rotatable main shaft in the direction of the centre axis when the rotatable main shaft is moved.

According to another variant of the invention the first stationary part is a stationary shaft. The rotatable main shaft and the at least one main bearing are preferably arranged inside the stationary shaft. Thus the rotatable main shaft and the at least one main bearing are moved together relatively to and inside the stationary shaft in the direction of the centre axis in the course of replacement of the at least one main bearing.

In an embodiment of the invention the tappet means comprise at least one projection arranged on the rotatable main shaft and substantially arranged on the front side of the at least one main bearing and/or a ring-shaped flute of the rotatable main shaft in which the at least one main bearing is at least partly arranged and/or a ring-shaped crank because of a diminution of the outer diameter of the rotatable main shaft substantially arranged on the front side of the at least on main bearing. According to that the projection which is preferably a ring-shaped projection, the ring-shaped flute or the ring-shaped crank takes the at least one main bearing along with the rotatable main shaft when the rotatable main shaft is pulled out of the stationary shaft.

But the tapped means are also able to comprise simply some bolts or screws or other fastening means fixing the at least one main bearing to the rotatable main shaft 14 that the rotatable main shaft takes the at least one main bearing along when the rotatable main shaft is pulled out of the stationary shaft.

In a further embodiment of the invention the wind turbine comprises a bearing support element detachably attached to the first stationary part, e.g. the stationary shaft and connected to the at least one main bearing. The bearing support element which is preferably a hollow cylinder shaped element is an intermediate member between the stationary shaft and the at least one main bearing. It is advantageous to fix the stationary part of the at least one main bearing to the bearing support element and to transfer the detachable connection between the bearing support element and the stationary shaft. Moreover it is advantageous in view of potential deadlocks between the at least one main bearing and the inside of the stationary shaft when the at least one main bearing slides along the inside of the stationary shaft during movement when the outer cylinder barrel surface of the bearing support element slides on the inner cylinder barrel surface of the stationary shaft.

In a variant of the invention the rotatable main shaft and/or the bearing support element comprises fastening means arranged on the rear side of the rotatable main shaft and/or the bearing support element for pulling the rotatable main shaft and the at least one main bearing or the rotatable main shaft, the at least one main bearing and the bearing support element out of the stationary part from the rear side of the wind turbine. Preferably the fastening means of the rotatable main shaft comprise at least one clamp e.g. for fixing robes, chains or steel cables.

The object concerning the method is achieved by a method for replacement of a main bearing of a wind turbine comprising a rotatable main shaft having a centre axis and being at least indirectly connected to a wind turbine rotor of the wind turbine and at least one main bearing supporting the rotatable main shaft at least indirectly against a first stationary part of the wind turbine, wherein in the course of replacement of the at least one main bearing the first or a second stationary part is connected to the wind turbine rotor for fastening the wind turbine rotor, the connection between the wind turbine rotor and the rotatable main shaft is released, the connection between the at least one main bearing and the first stationary part is released and the at least one main bearing or the at least one main bearing and the rotatable main shaft are moved relatively to the first stationary part in the direction of the centre axis for replacement of the at least one main bearing. Thus as described before no removal of the wind turbine rotor is necessary for the replacement of the at least one main bearing.

According to an embodiment of the invention the at least one main bearing or the at least one main bearing and the rotatable main shaft are moved to the rear side of the wind turbine for replacement of the at least one main bearing. In the rear side of the wind turbine space is provided for replacement of the main bearing.

As already previously mentioned the rotatable main shaft comprises at least one projection substantially arranged on the front side of the main bearing and/or a ring-shaped flute in which the main bearing is at least partly arranged and/or a ring-shaped crank because of a diminution of the outer diameter of the rotatable main shaft substantially arranged on the front side of the main bearing for taking the at least one main bearing along with the rotatable man shaft during movement of the rotatable main shaft. Thus when the rotatable main shaft is moved to the rear side of the wind turbine also the at least one main bearing is moved to the rear side of the wind turbine where it is able to be replaced.

The further variants of the inventive method comprise the already afore mentioned properties and advantages described in the context of the inventive wind turbine.

BRIEF DESCRIPTION OF THE DRAWINGS

The invention will in the following be explained in more detail with reference to the schematic drawings.

DETAILED DESCRIPTION OF INVENTION

Figure 1:
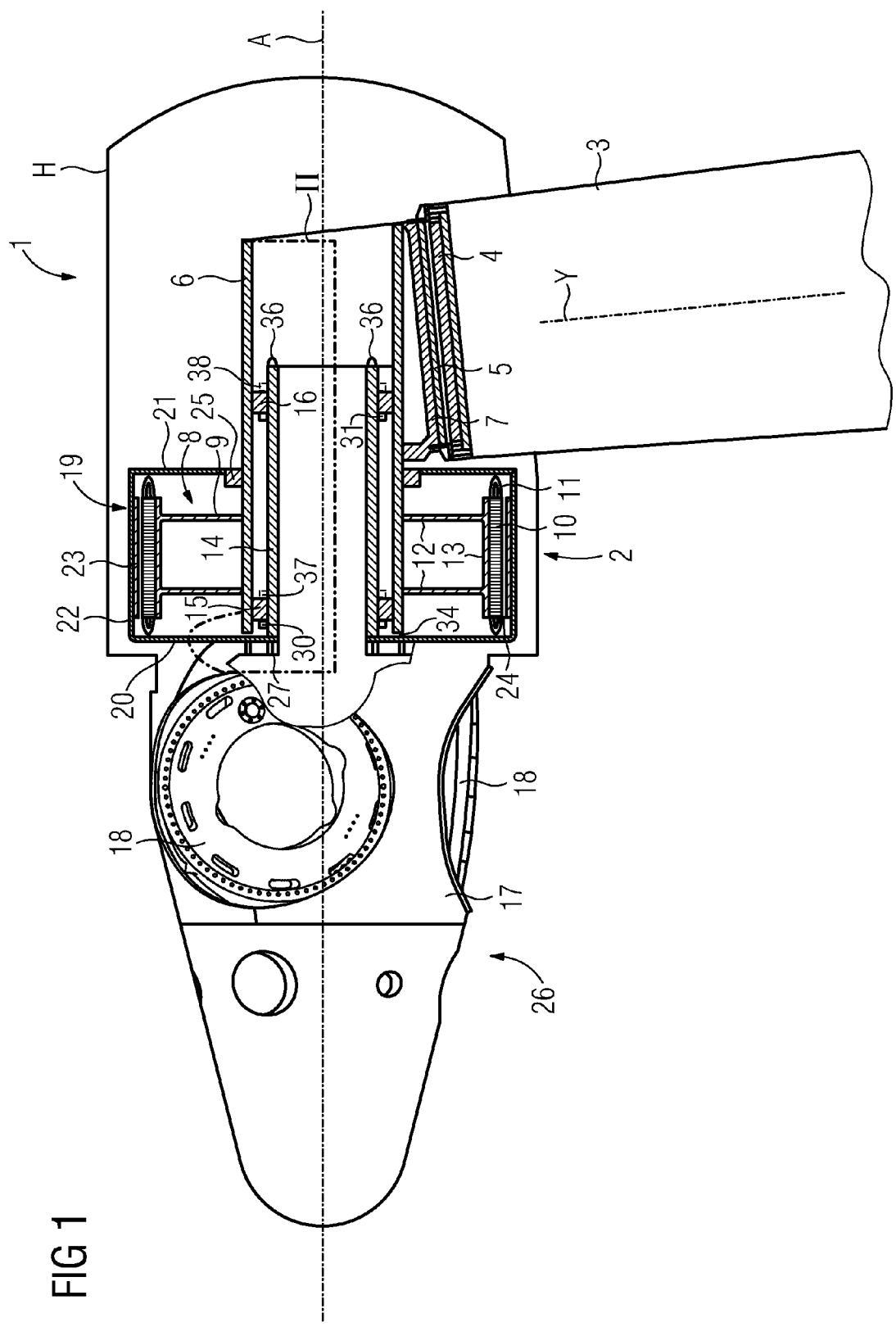
FIG. 1 shows a part of an inventive wind turbine with a first bearing arrangement.

FIG. 1 shows schematically an embodiment of an inventive wind turbine 1 comprising a direct drive generator 2 which is arranged on the upwind side of a tower 3 of the wind turbine 1.

A tower flange 4 is arranged on the top of the tower 3. A bedplate 5 is attached to the tower flange 4. The wind turbine 1 comprises in a not explicitly shown manner a yaw system for turning the bedplate 5 of the wind turbine 1 around the axis Y of the tower 3 together with the other components of the wind turbine 1 which are directly or indirectly attached to the bedplate 5.

The wind turbine 1 comprises as a first stationary or fixed part a stationary outer shaft 6. The rear side of the stationary outer shaft 6 is attached to a retaining arrangement 7 which is attached to the bedplate 5. On the front side of the stationary outer shaft 6 a stator arrangement 8 of the direct drive generator 2 is arranged. The stator arrangement 8 comprises a stator support structure 9 and a lamination stack 10 with windings 11. The stator support structure 9 comprises two support elements 12 for a two side support of the lamination stack 10. In case of the present embodiment of the invention the support elements 12 are ring-shaped support elements 12 attached, e.g. bolted, to the outside of the stationary outer shaft 6. The ring-shaped support elements 12 are able to be compact or are able to comprise spokes or a spoke structure. A kind of hollow cylindrical support element 13 is attached to the outer ends of the ring-shaped support elements 12. The hollow cylindrical support element 13 carries the ring-shaped lamination stack 10 with windings 11. The lamination stack 10 is able to comprise ring segment shaped lamination stack segments each having at least one winding 11 which segments build in their entirety the lamination stack 10.

A rotatable main shaft 14 having a centre axis A is arranged inside the stationary outer shaft 6 and in case of the present embodiment of the invention rotatably supported by two main bearings 15, 16 against the stationary outer shaft 6. In case of the present embodiment of the invention the centre axis A is a joint centre axis A of the rotatable main shaft 14 and the stationary outer shaft 6. A wind turbine rotor 26 comprising a hub 17 and not shown rotor blades is connected to the front side of the rotatable main shaft 14 e.g. by means of bolts 27.

Thus the rotatable main shaft 14 can turn together with the wind turbine rotor 26. In FIG. 1 only two of three mounting devices 18 for the well known rotor blades are shown.

A rotor arrangement 19 is substantially arranged around the stator arrangement 8. In case of the present embodiment of the invention the rotor arrangement 19 comprises a front ring-shaped endplate 20, a rear ring-shaped endplate 21 and a hollow cylinder element 22 connecting the front ring-shaped endplate 20 and the rear ring-shaped endplate 21 to each other. On the inside the hollow cylinder element 22 comprises a plurality of permanent magnets 23 substantially arranged oppositely to the lamination stack 10. An air gap 24 having a width of approximately 5 mm is located between the permanent magnets 23 and the lamination stack 10.

In case of the present embodiment of the invention the front ring-shaped endplate 20 is connected e.g. bolted to the wind turbine rotor 26 and the rotatable main shaft 14 by means of the bolts 27. The rear ring-shaped endplate 21 is connected to the stationary outer shaft 6 by means of a third bearing, a so called support bearing 25. Thus also the rotor arrangement 19 has a two side support. Moreover the rotor arrangement 19 can turn together with the wind turbine rotor 26 and the rotatable main shaft 14, wherein in particular the permanent magnets 23 turn relatively to the lamination stack 10 for power generation.

The direct drive generator 2, the stationary shaft 6, the retaining arrangement 7 and the rotatable main shaft 14 are arranged in a nacelle H.

Figure 2:
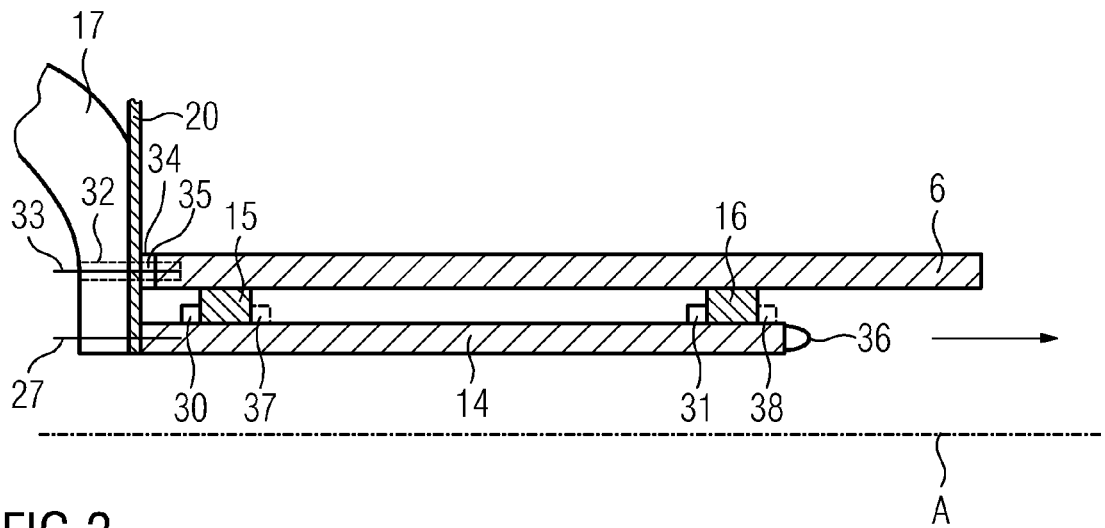
FIG. 2 shows the enlarged section II of FIG. 1 of the first bearing arrangement.

In case of the embodiment shown in FIG. 1 the rotatable main shaft 14 is provided with tappet means in form of two ring-shaped preferably removable projections 30, 31. The first ring-shaped projection 30 is arranged on the front side of the first main bearing 15 and the second ring-shaped projection 31 is arranged on the front side of the second main bearing 16. An enlarged illustration of this arrangement is shown in FIG. 2.

For replacement of one or both main bearings 15, 16 e.g. because of wear or failure of a main bearing in case of the present embodiment of the invention fastening means are provided for fastening the wind turbine rotor 26 to the stationary shaft 6. The fastening means comprise in case of the present embodiment of the invention bolt holes 32 and bolts 33 for bolting the wind turbine rotor 26 and the stationary shaft 6 together. Thereby the stationary shaft 6 is longer as usual in the direction of the wind turbine rotor 26 to permit the bolted joint. The necessary ring-shaped gap 34 between the stationary shaft 6 and the wind turbine rotor 26 or in the present case between the front endplate 20 which is attached to the wind turbine rotor 26 and the stationary shaft 6 is filled with a plurality of shims 35 which are arranged in certain locations in the ring-shaped gap 34. Thus substantially no deflections of the wind turbine rotor 26, the front endplate 20 and the stationary shaft 6 occur when the bolted joint is arranged. Possibly the shims 35 are not necessary when the gap 34 is very small.

When the bolted joint between the wind turbine rotor 26 and the stationary shaft 6 is completed the wind turbine rotor 26 is fixed and thus in a stable and safe position. By the way the wind turbine rotor 26 is also able to be fixed to another appropriate stationary or fixed part of the wind turbine.

In a next step the bolted joint comprising the bolts 27 between the wind turbine rotor 26 and the rotatable main shaft 14 as well as the connections between the main bearings 15, 16 and the stationary shaft 6 which connections are also able to be bolt joints are released. Now the rotatable main shaft 14 and the mains bearings 15, 16 are free for movement in the direction of the centre axis A.

In case of the present embodiment of the invention the rotatable main shaft 14 comprises fastening means in form of several clamps 36 on the rear side. The clamps 36 are distributed around the perimeter of the rotatable main shaft 14. Robes, chains, steel cable etc. are able to be fastened to the clamps 36. In this way the rotatable main shaft 14 is able to be pulled out of the stationary shaft 6. The ring-shaped projections 30, 31 take the mains bearings 15 and 16 along with the rotatable main shaft 14 and thus out of the stationary shaft 6. Thereby the outer surfaces of the main bearings 14, 15 slide along the inner surface of the stationary shaft 6. When the main bearings 14 and 15 were moved to the rear side of the wind turbine they can be in a comparatively simple way replaced by other main bearings e.g. by releasing or pulling the main bearings from the rotatable main shaft 14 after removals of the projections 30 and 31. Alternatively segmented main bearings are applicable e.g. as disclosed in DE 201 16 649 U1.

Vice versa the rotatable main shaft 14 provided with new main bearings is able to be pushed into the stationary shaft 6. Thereby it is advantageous when additional preferably removable ring-shaped projections 37, 38 are arranged on the rear side of the main bearings to bring the new main bearings to their provided location inside the stationary shaft 6.

Figure 3:
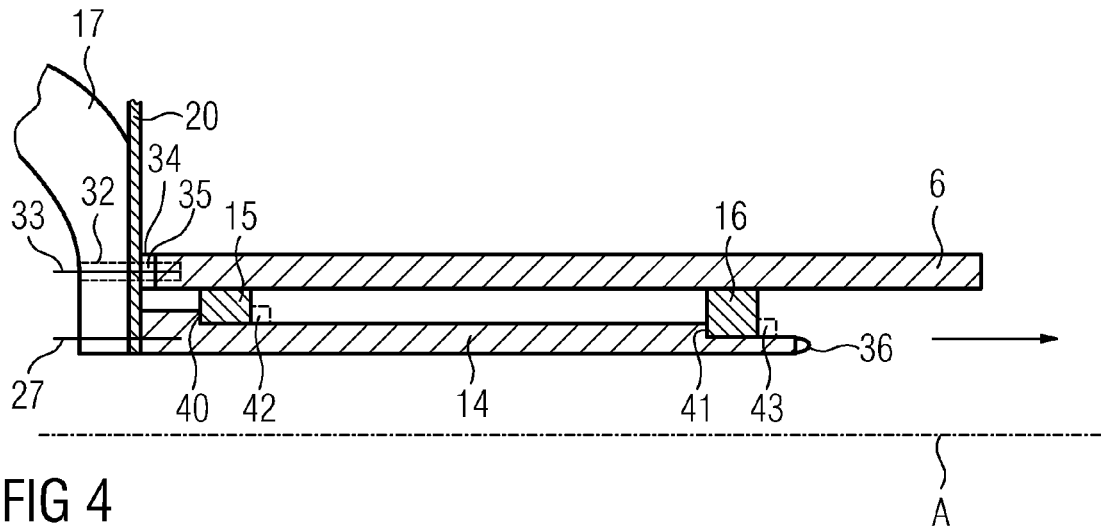
FIG. 3 shows a second bearing arrangement.
Figure 4:
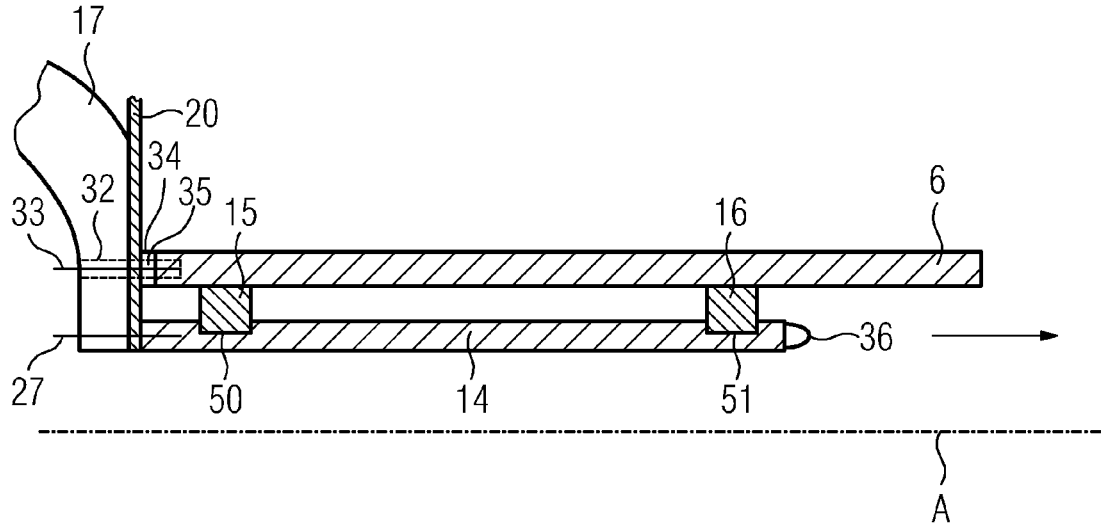
FIG. 4 shows a third bearing arrangement.

FIG. 3 and FIG. 4 show possible other embodiments of the bearing arrangement.

As shown in FIG. 3 the rotatable main shaft 14 is able to have a kind of step structure. In case of the present embodiment of the invention the main shaft 14 comprises a first ring-shaped crank 40 and a second ring-shaped crank 41, wherein each ring-shaped crank is generated by a diminution of the outer diameter of the rotatable main shaft 14. The first main bearing 15 is arranged with its front side on the first ring-shaped crank 40 and the second main bearing 16 is arranged with its front side on the second ring-shaped crank 41. Thus both main bearings 15, 16 are taken along with the rotatable main shaft 14 when the rotatable main shaft 14 is moved in the direction of the centre axis A to the rear side of the wind turbine.

Thereby again the outer surfaces of the main bearings 14, 15 slide along the inner surface of the stationary shaft 6. When the main bearings 15 and 16 were moved to the rear side of the wind turbine they are able to be replaced by other main bearings.

As mentioned previously it is advantageous when additional preferably removable ring-shaped projections 42, 43 are arranged on the rear side of the main bearings for bringing the new main bearings arranged on the rotatable main shaft 14 to their provided location inside the stationary shaft 6.

A section of a third embodiment of the bearing arrangement is shown in FIG. 4, wherein the rotatable main shaft 14 comprises two flutes 50, 51. In the first flute 50 the first main bearing 15 and in the second flute 51 the second main bearing 16 is arranged. In this case the main bearings 15, 16 are preferably segmented main bearings as disclose in DE 201 16 649 U1.

According to this both main bearings 15, 16 are taken along with the rotatable main shaft 14 when the rotatable main shaft 14 is moved in the direction of the centre axis A to the rear side of the wind turbine, where the main bearings 15, 16 are able to be replaced.

Figure 5:
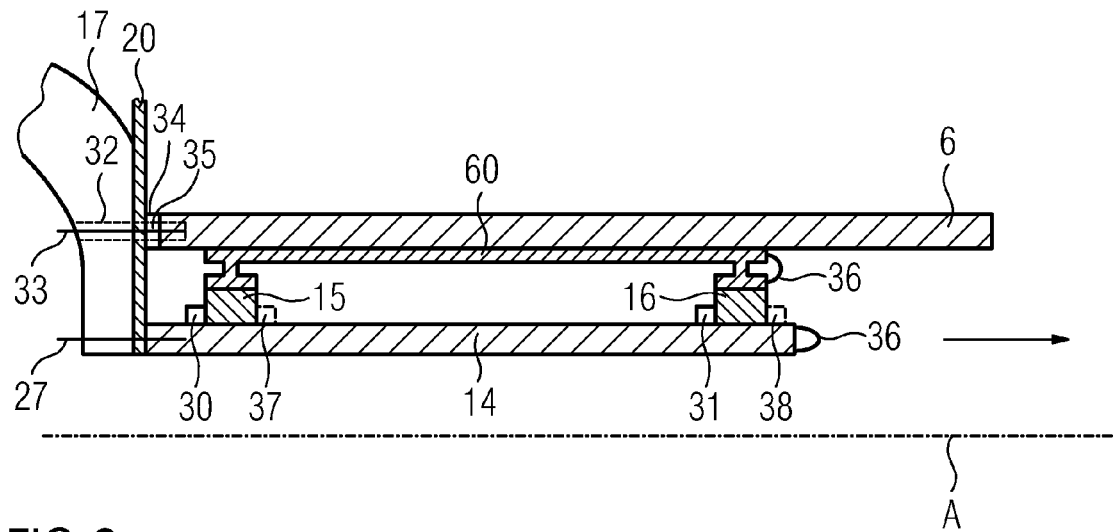
FIG. 5 shows a modified bearing arrangement of the bearing arrangement of FIG. 1 and FIG. 2 comprising a bearing support element.
Figure 6:
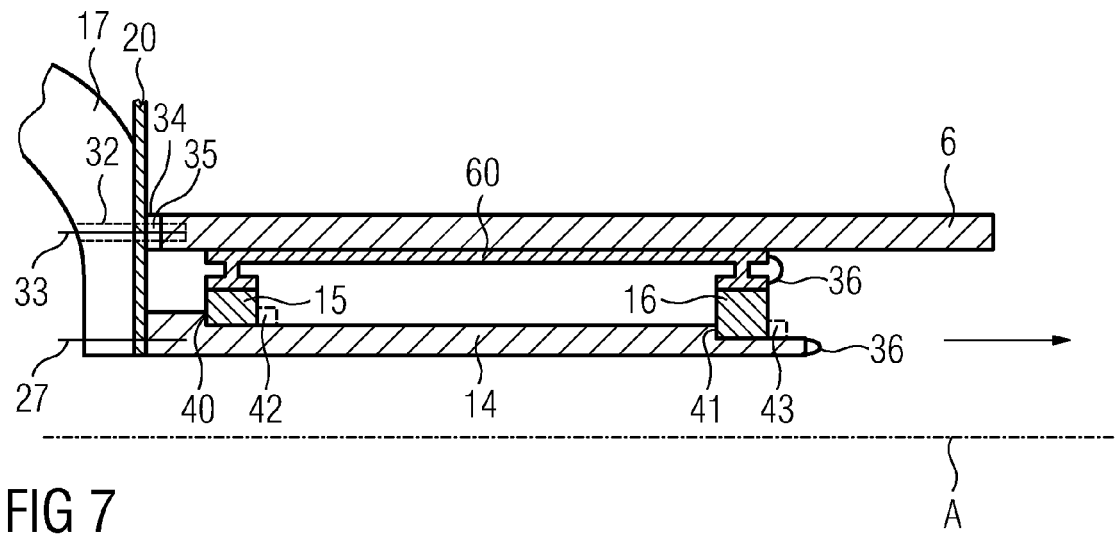
FIG. 6 shows the modified bearing arrangement of the bearing arrangement of FIG. 3 comprising a bearing support element and FIG. 7 shows the modified bearing arrangement of the bearing arrangement of FIG. 4 comprising a bearing support element.
Figure 7:
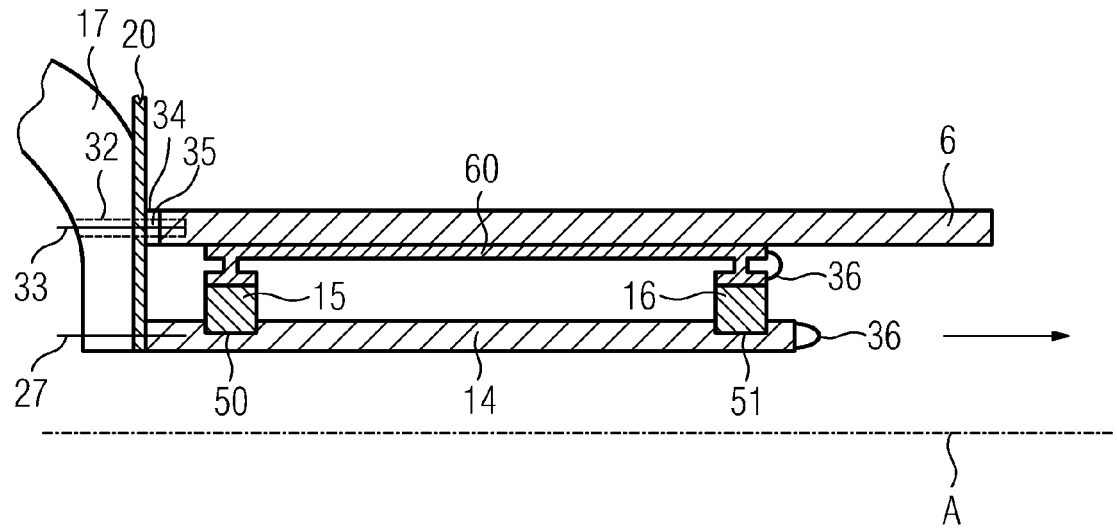

The FIGS. 5 to 7 show modified bearing arrangements of the bearing arrangements of the FIGS. 2 to 4. In each case a separate bearing support element 60 is arranged between the two main bearings 15, 16 and the stationary shaft 6. The bearing support element 60 is in case of the present embodiment of the invention a hollow cylinder shaped element 60.

Each of the two main bearings 15, 16 is with its rotary bearing part attached to the rotatable main shaft 14 and with its stationary bearing part attached to the bearing support element 60. The bearing support element 60 is attached e.g. bolted to the stationary shaft 6.

In the course of the replacement of the main bearings 15, 16 the bolted joint between the wind turbine rotor 26 and the rotatable main shaft 14 as well as the bolted joint between the bearing support element 60 and the stationary shaft 6 are released. Consequently the rotatable main shaft 14, the main bearings 15, 16 and the bearing support element 60 are able to be moved in the direction of the centre axis A to the rear side of the wind turbine and thus pulled out of the stationary shaft 6 for replacement of the at least one of the main bearings 15, 16. The bearing support element 60 comprises also clamps 36 where robes, chains and/or steel cables are able to be fastened for pulling the rotatable main shaft 14, the main bearings 15, 16 and the bearing support element 60 out of the stationary shaft 6. Thereby the outer cylinder barrel surface of the bearing support element 60 slides along the inner cylinder barrel surface of the stationary shaft 6.

In an alternative embodiment of the invention the projections of the rotatable main shaft need not to be ring-shaped projections. Indeed the projections are able to be realized as studs arranged on a circle around the perimeter of the rotatable main shaft in a certain distance from each other.

Moreover the tappet means are able to comprise simply bolts, screws or other appropriate fastening means to fix the main bearings 15, 16 to the rotatable main shaft 14 that the rotatable main shaft 14 takes the main bearings along when the rotatable main shaft 14 is pulled out of the stationary shaft 6.

The invention claimed is:

1. A wind turbine comprising:
    a rotatable main shaft having a centre and being at least indirectly connected to a wind turbine rotor of the wind turbine; and
    a main bearing supporting the rotatable main shaft at least indirectly against a first stationary part of the wind turbine;
    fastening unit for fastening the wind turbine rotor to the first or a second stationary part of the wind turbine during replacement of the main bearing; and
    tappet unit acts on the main bearing and permits a movement of the main bearing relatively to the first stationary part in the direction of the centre axis.

2. The wind turbine according to claim 1, wherein the fastening unit comprise bolt holes and/or bolts and/or a shim.

3. The wind turbine according to claim 1,
    wherein the tappet unit is provided on the rotatable main shaft; and
    wherein in the course of replacement of the main bearing the rotatable main shaft and the main bearing are moved together relative to the first stationary part in the direction of the centre axis.

4. The wind turbine according to claim 1, wherein the first stationary part is a stationary shaft.

5. The wind turbine according to claim 1,
    wherein the tappet unit is a projection arranged on the rotatable main shaft and substantially arranged on a front side of the main bearing.

6. The wind turbine according to claim 1,
    wherein the tappet unit is a ring-shaped flute of the rotatable main shaft in which the main bearing is at least partly arranged.

7. The wind turbine according to claim 1,
    wherein the tappet unit is a ring-shaped crank substantially arranged on the front side of the main bearing due to a diminution of an outer diameter of the rotatable main shaft.

8. The wind turbine according to claim 1, further comprises:
    a bearing support element detachably attached to the first stationary part and connected to the main bearing.

9. The wind turbine according to claim 8, wherein
    the bearing support element is a hollow cylinder shaped element.

10. The wind turbine according to claim 8, wherein the rotatable main shaft and/or the bearing support element comprises fastening device arranged on the rear side of the rotatable main shaft and/or the bearing support element for pulling the rotatable main shaft and the main bearing or the rotatable main shaft, the main bearing and the bearing support element out of the stationary part from a rear side of the wind turbine.

11. The wind turbine according to claim 10, wherein the fastening device comprises a clamp.

12. A method for replacement of a main bearing of a wind turbine comprising a rotatable main shaft with a centre axis and being at least indirectly connected to a wind turbine rotor of the wind turbine and a main bearing supporting the rotatable main shaft at least indirectly against a first stationary part of the wind turbine, the method comprising during a course of replacement of the main bearing:
    connecting the first or a second stationary part to the wind turbine rotor for fastening the wind turbine rotor;
    releasing the connection between the wind turbine rotor and the rotatable main shaft;
    releasing the connection between the main bearing and the first stationary part; and
    moving, for replacement of the main bearing, the main bearing or the main bearing and the rotatable main shaft, the moving is relative to the first stationary part in the direction of the centre axis.

13. The method according to claim 12, wherein the main bearing or the main bearing and the rotatable main shaft are moved to a rear side of the wind turbine.

14. The method according to claim 12, in order to move the main bearing along with the rotatable main shaft during the moving, the method comprising during a course of replacement of the main bearing:
    providing a projection substantially arranged on a front side of the main bearing and/or
    providing a ring-shaped flute in which the main bearing is at least partly arranged and/or
    providing a ring-shaped crank substantially arranged on the front side of the main bearing.

15. The method according to claim 12, wherein the wind turbine comprises a bearing support element detachably attached to the first stationary part and connected to the main bearing, the method further comprising during a course of replacement of the main bearing:
    releasing, for replacement of the main bearing, the connection between the bearing support element and the first stationary part; and
    moving the bearing support element, the main bearing and the rotatable main shaft to the rear side of the wind turbine.

* * * * *